US007955530B2

(12) United States Patent
Park et al.

(10) Patent No.: US 7,955,530 B2
(45) Date of Patent: *Jun. 7, 2011

(54) METAL COMPOSITE OXIDES CONTAINING STRONTIUM AND IONIC CONDUCTORS USING THE SAME (75) Inventors: Mi Hyae Park, Seoul (KR); Eung Je Lee, Seoul (KR); Yun Ho Roh, Seoul (KR); Seung Tae Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1310 days.

This patent is subject to a terminal disclaimer.

(21) Appl. No.: 11/514,940

(22) Filed: Sep. 5, 2006

(65) Prior Publication Data
US 2007/0111074 A1 May 17, 2007

(30) Foreign Application Priority Data

Sep. 6, 2005 (KR) .................. 10-2005-0082490
Oct. 17, 2005 (KR) .................. 10-2005-0097711

(51) Int. Cl.
*H01B 1/08* (2006.01)
(52) U.S. Cl. .............. 252/521.1; 252/521.5; 423/594.16
(58) Field of Classification Search .............. 252/520.5, 252/521.1, 521.5; 423/594.8, 594.16
See application file for complete search history.

(56) References Cited

U.S. PATENT DOCUMENTS

| 5,213,911 | A | 5/1993 | Bloom et al. |
| 5,403,461 | A | 4/1995 | Tuller et al. |
| 6,287,716 | B1 | 9/2001 | Hashimoto et al. |
| 7,566,411 | B2 * | 7/2009 | Lee et al. ............ 252/520.5 |
| 2004/0062968 | A1 | 4/2004 | Tanner |
| 2006/0051278 | A1 | 3/2006 | Hong et al. |

FOREIGN PATENT DOCUMENTS

WO    WO2006/066918    *  6/2006

OTHER PUBLICATIONS

Animitsa et al "Electric Properties of Solid Solutions Based on Strontium Tantalate . . . ", Russian Journal of Electrochem 2010 46(2) 161-167.*
Animitsa et al "Strontium Tantalates with a Perovskite Structure . . . ", Russian Journal of Electrochem 2001 37(3) 266-272.*
Animitsa et al "States of H+-containing species and proton migration forms in hydrated niobates and tantalates of alkaline-earth metals with a perovskite-related structre", Solid State Ionics 162-163 2003, pp. 73-81.*
Animitsa et al "Strontium tantalates with perovskite-related structure", Solid State Ionics 136-137 2000, pp. 265-271.*
Browall et al "Oxygen ion conductivity in oxygen-deficient perovskite-related oxides", Materials Research Bulletin 11(12) Dec. 1976, pp. 1475-81 (Abstract only).*
Animitsa, I. et al., *Phase Relations During Water Incorporation in the Oxygen and Proton Conductor $Sr_6 Ta_2 O_{11}$*, Solid State Ionics, 156 (2003) pp. 95-102.

* cited by examiner

*Primary Examiner* — Mark Kopec
(74) *Attorney, Agent, or Firm* — McKenna Long & Aldridge LLP (57) ABSTRACT

Disclosed is an ionic conductor comprising a metal composite oxide characterized by comprising oxygen defects and metal defects in a cryolite lattice. An electrochemical device comprising the ionic conductor is also disclosed. The metal composite oxide has an improved ion conductivity, because formation of an open space within a lattice is ensured by the defects of metal ion sites in the lattice. Therefore, the metal composite oxide is useful for an ionic conductor or an electrochemical device requiring ionic conductivity.

15 Claims, 4 Drawing Sheets

$TaO_6$ Octahedron

TaO₆ Octahedron

METAL COMPOSITE OXIDES CONTAINING STRONTIUM AND IONIC CONDUCTORS USING THE SAME

This application claims the benefit of the filing date of Korean Patent Application Nos. 10-2005-0082490 and 10-2005-0097711, filed Sep. 6, 2005 and Oct. 17, 2005, respectively in Korea, which are hereby incorporated by reference in their entirety for all purposes as if fully set forth herein.

TECHNICAL FIELD

The present invention relates to a novel metal composite oxide that exhibits ionic conductivity. More particularly, the present invention relates to a novel metal composite oxide with an open space formed for easy movement of ions due to metal ion defects within a crystal lattice, an ionic conductor comprising the metal composite oxide and an electrochemical device comprising the ionic conductor.

BACKGROUND ART

Active studies have been made to ionic conductors, particularly oxygen ion conductors, which are electrolytes used in electrochemical devices, such as gas sensors and fuel cells.

Currently, in solid oxide fuel cell ("SOFC") applications, it has been known that yttrium stabilized zirconia ("YSZ") is the most suitable material for use as a high-temperature SOFC electrolyte. However, a doped ceria-type is more suitable for a low-temperature (lower than 600° C.) SOFC. In a high-temperature SOFC using any other electrolyte (doped ceria or $La_{0.8}Sr_{0.2}GaO_{3-\delta}$) than YSZ, materials such as $La_{0.9}Sr_{0.1}AlO_{3-\delta}$ or $Gd_2Zr_2O_7$ can be used as a protective layer of a cathode. An ionic conductor membrane for use in an oxygen pump should have both electrical conductivity and ionic conductivity. Accordingly, doped ceria, rather than YSZ with very low electrical conductivity, is suitable to be used in an oxygen pump.

Although all the materials as described above have a certain potential in industrial applications, they have merits and demerits depending on particular application to which they are applied. It is thought that this is because each material shows different ion conductivity characteristics and physicochemical properties depending on temperatures due to its unique feature such as crystalline structure or ion defect structure. Therefore, it is very important to develop new materials having various ion conductivity characteristics required for various applications. Such materials may result in the rapid development of relevant technologies requiring ion conductors.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

The inventors have discovered that a novel metal composite oxide essentially comprising strontium (Sr) mixed with at least one different metal component at a specific ratio has defects that have not been known to date in specific metal ion sites and shows an improved ion conductivity by ensuring the formation of an open space within a crystal lattice by the metal ion defects.

Therefore, it is an object of the present invention to provide a metal composite oxide having ion conductivity, an ionic conductor including the metal composite oxide, and an electrochemical device comprising the ionic conductor.

The present invention provides an ion conductor characterized by comprising oxygen defects and metal defects within a lattice of cryolite, and an electrochemical device including the ion conductor.

Also, the present invention provides a novel strontium-containing composite oxide that can be represented by the following Formula 1 or Formula 2:

[Formula 1]

$$Sr_{12-x}B_4O_{21\pm\delta}C_z \qquad (I)$$

wherein B is Ta, Nb or a combination of Ta with Nb;
C is at least one anion selected from the group consisting of S and halogen atoms, or $H^+$ cation;
x is a decimal ranging from 0.8 to 1.2 ($0.8 \leq x \leq 1.2$);
$\delta$ is a decimal ranging from 0 to 3 ($0 \leq \delta \leq 3$); and
z is a decimal ranging from 0 to 7 ($0 \leq z \leq 7$).

[Formula 2]

$$Sr_{11-x+y}A_xB_4O_{24-\delta}C_z \qquad (II)$$

wherein A is at least one element selected from the group consisting of La, Ba and Y;
B is at least one element selected from the group consisting of Ta and Nb;
C is at least one anion selected from the group consisting of S and halogen atoms or $H^+$ cation;
x is a decimal ranging from 0 to 3 ($0 \leq x \leq 3$);
y is a decimal ranging from −1 to 1 ($-1 \leq y \leq 1$);
$\delta$ is a decimal ranging from 0 to 3 ($0 \leq \delta \leq 3$); and
z is a decimal ranging from 0 to 7 ($0 \leq z \leq 7$).

Hereinafter, the present invention will be explained in more detail.

The novel metal composite oxide according to the present invention is characterized by having improved ion conductivity due to the presence of defects of unique metal ion sites in a lattice.

Among the compounds having a cryolite structure related to a perovskite structure, some compounds having oxygen ion defects in a lattice structure have been previously known.

On the contrary, the novel metal composite oxide according to the present invention has a unique structural feature by comprising metal ion defects in addition to the aforementioned oxygen defects.

The metal ion defects can ensure formation of an additional open space in a lattice structure, and the open space facilitates ion movements, so as to impart improved ion conductivity. Hence, the novel metal composite oxide according to the present invention may be expected to serve sufficiently as an ionic conductor showing conductivity according to the ion movements. In fact, as can be seen from the following experimental examples, the metal composite oxide according to the present invention, represented by the above Formula 1 or Formula 2, includes specific metal ion defects and has a high oxygen ion conductivity (see FIGS. 5 and 6).

There is no particular limitation in the metal composite oxide according to the present invention, as long as the metal composite oxide has metal ion defects in addition to oxygen defects. Preferably, the metal composite oxide is represented by Formula 1 and/or Formula 2.

The metal composite oxides represented by Formula 1 and/or Formula 2 are novel strontium-containing composite oxides that have never been disclosed to date, while they have a cryolite structure and include additional metal ion defects besides oxygen defects in the lattice. Therefore, the metal composite oxides ensure formation of an open space within the lattice due to the presence of the metal defects, thereby showing excellent ion conductivity.

In fact, when the metal composite oxides represented by Formula 1 and Formula 2 are in a cubic structure, it is preferred that the metal composite oxides satisfy the crystallographic coordinates and the site occupancies as shown in the following Table 1 (space group No. 225, Fm3m). Herein, the crystallographic coordinates in the lattice are based on space group No. 225, p. 689 of "International tables for crystallography" (vol. A, 5$^{th}$ ed. Kiuwer Academic Publishers, 2002). Particularly, as the site occupancy decreases, factors interrupting ion conductive channels also decrease, and thus excellent ion conductivity can be provided. Thus, a smaller site occupancy is more preferred, if the corresponding crystal structure can be maintained.

TABLE 1

| Crystallographic coordinates of cations (X, Y, Z) | Site occupancy (O) |
|---|---|
| 8c (¼, ¼, ¼) | $0 < O \leq 1$ |
| 4b (½, ½, ½) | $0 < O \leq 1$ |
| 4a (0, 0, 0) | $0 < O \leq 1$ |
| 24e (x, 0, 0), $0.20 \leq x \leq 0.30$ | $0 < O \leq 1$ |

In the metal composite oxides represented by Formula 1 and/or Formula 2, C is preferably an H$^+$ cation (proton). This is because H$^+$ (proton) present in the lattice due to the absorption of moisture (H$_2$O) included in a wet atmosphere can easily move through the open space formed by the metal ion defects as mentioned above and function as an ionic conductor.

In practice, it is known that many perovskite-related oxides having oxygen ionic conductivity generally show hydrogen ionic conductivity in a moisture-containing atmosphere (T. Norby, Solid State Ionics, 125 (1999) 1-11; I. Animitsa, T. Norby, S. Marion, R. Glockner, A. Neiman, Solid State Ionics, 145, (2001) 357-364). In view of this fact, it is assumed that the metal composite oxides according to the present invention, which include specific metal ion defects and show oxygen ionic conductivities through an open space formed by such metal ion defects, may also allow hydrogen ions (protons) to easily move through the open space, and thus exhibit both oxygen ionic conductivity and hydrogen ionic conductivity.

The metal composite oxide represented by Formula 1 may have a cubic crystal system, whose lattice parameter is 8.327±0.5 Å and whose space group is fm-3m (No. 225). Non-limiting examples of the metal composite oxide represented by Formula 1 include $Sr_{11}Ta_4O_{21}$, $Sr_{11}Nb_4O_{21}$, or the like.

In addition, the metal composite oxide represented by Formula 2 may have a cubic crystal system or a body centered tetragonal crystal system including a lattice that elongates in one direction. When the metal composite oxide is in a cubic crystal system, the lattice parameter and the space group may be 8.327±0.5 Å and fm-3m (No. 225), respectively. When the metal composite oxide is in a body centered tetragonal crystal system, the space group may be 14/mmm, and the crystal system may have the following lattice parameters: a=5.8536±0.5 Å and c=8.327±0.5 Å. Non-limiting examples of the metal composite oxide represented by Formula 2 include $Sr_9La_2Ta_4O_{22}$, $Sr_8La_3Ta_4O_{22.5}$, $Sr_9Y_2Nb_4O_{22}$, $Sr_{10}Y_1Nb_4O_{21.5}$, $Sr_{10}Ba_1Nb_4O_{21}$, or the like.

Besides the compounds represented by Formula 1 and/or Formula 2 or derivatives thereof, any compounds having the aforementioned structural features and showing ionic conductivity may also be included in the scope of the present invention.

The metal composite oxides according to the present invention can be prepared by conventional methods generally known to those skilled in the art. For example, the metal composite oxides can be prepared by mixing: (1) precursor compounds each containing one or more elements specified in Formula 1 (e.g. (a) Sr; and (b) Nb, Ta or a combination thereof, or the like); or (2) precursor compounds each containing one or more elements specified in Formula 2 (e.g. (a) Sr; (b) La, Ba, Y or a combination thereof; and (c) Ta, Nb or a combination thereof, or the like), at an appropriate molar ratio, calcining the resultant mixture at a temperature between 700° C. and 1,700° C., and then cooling the mixture.

As the precursor compounds of the metal composite oxide of Formula 1, any salts containing one or more elements selected from the group consisting of (a) Sr; and (b) Nb, Ta or a combination thereof, etc. can be used. As the precursor compounds of the metal composite oxide of Formula 2, any salts containing one or more elements selected from the group consisting of a) Sr; (b) La, Ba, Y or a combination thereof; and (c) Ta, Nb or a combination thereof, etc. can be used. There is no limitation in the molar ratio of the precursor compounds. The precursor compounds can be mixed together at an appropriate molar ratio determined according to the final product.

Preferably, the mixture of the precursor compounds is calcined at a temperature above 700° C., preferably between 700° C. and 1,700° C., for 5 to 72 hours.

For the calcination process, the following conventional methods can be used: a first method of forming the mixture in a pellet and calcining the pellet; and a second method of calcining the mixture itself. However, there is no limitation in using any calcination method.

The calcined mixture is cooled to room temperature to obtain a single-phase metal composite oxide having the novel crystal structure according to the present invention (for example, a barium-tungsten oxide and derivatives thereof). The cooling process can be carried out at room temperature. Alternatively, the calcined mixture can be rapidly cooled using liquid nitrogen or water at room temperature.

The present invention provides ionic conductors including metal composite oxides with the novel crystal structure, preferably, oxygen- or proton-selective ionic conductors.

Ionic conductors are materials that conduct electricity with the movement of ions. Generally, ionic conductors are used in a membrane type having a separation factor that selectively permeates one element.

The ionic conductors according to the present invention can be prepared using a conventional method generally known in the art. For example, the ionic conductor can be prepared by coating a conductive electrode to apply an electric field. At this time, a metal composite oxide of the present invention can be used alone as an ionic conductor or mixed appropriately with any other materials known in the art according to purposes or applications.

In addition, the present invention provides electrochemical devices comprising metal composite oxides having the novel crystal structure as ionic conductors.

The electrochemical devices can be any device for performing electrochemical reactions, which includes, but is not limited to, an oxygen probe, a fuel cell, a chemical membrane reactor, an oxygen separation membrane, an oxygen pump, a hydrogen separation membrane, a hydrogen pump, a hydrogen gas sensor, a steam sensor, a hydrocarbon sensor, a hydrogen extraction, a hydrogen pressure controller, isotope enrichment, tritium technology, steam electrolysis, $H_2S$ electrolysis, HCl electrolysis, hydrogenation of hydrocarbon, dehydrogenation, $NH_3$ formation, an electrochemical cell, an electrochromic device, a gas sensor or a $NO_x$ trap.

The metal composite oxides included in the electrochemical devices according to the present invention, for example, a barium-tungsten oxide or a derivative thereof, plays a role as an oxygen or proton ionic conductor. Accordingly, the metal composite oxide can be used for electrochemical filtration through a porous filter, electrochemical treatment of a gas-state efflux or heterogeneous catalysis. The metal composite oxides can also be used in a chemical membrane reaction of a reactor for controlling oxidation of hydrocarbon or incorporated into an oxygen separation membrane. In addition, the metal composite oxides can be used as an electrolyte of a fuel cell that uses hydrogen as a fuel.

BEST MODE FOR CARRYING OUT THE INVENTION

Reference will now be made in detail to the preferred embodiments of the present invention. It is to be understood that the following examples are illustrative only and the present invention is not limited thereto.

Examples 1~2

Preparation of Metal Composite Oxide Represented by Formula 1

Example 1

Strontium carbonate ($SrCO_3$) and tantalum oxide ($Ta_2O_5$) were weighed and mixed at a metal-based molar ratio of 11:4. The resultant mixture was heated at a temperature of 1,000° C. for 48 hours. The heated mixture was cooled to room temperature and remixed so as to be in a powder state or to form pellets. The powder or pellets were heated in air at 1,150° C. for 48 hours, and then cooled to complete the preparation of compound $Sr_{11}Ta_4O_{21}$.

Example 2

Example 1 was repeated to provide compound $Sr_{11}Nb_4O_{21}$, except that niobium oxide ($Nb_2O_5$) was used instead of tantalum oxide ($Ta_2O_5$).

Examples 3~7

Preparation of Metal Composite Oxide Represented by Formula 2

Example 3

Strontium carbonate ($SrCO_3$), lanthanum oxide ($La_2O_3$) and tantalum oxide ($Ta_2O_3$) were weighed and mixed at a metal-based molar ratio of 9:2:4. The resultant mixture was heated at a temperature of 1,000° C. for 48 hours. The heated mixture was cooled to room temperature and remixed so as to be in a powder state or to form pellets. The powder or pellets were heated in air at 1,300° C. for 48 hours, and then cooled to complete the preparation of compound $Sr_9La_2Ta_4O_{22}$.

Example 4

Example 3 was repeated to provide compound $Sr_8La_3Ta_4O_{22.5}$, except that strontium carbonate, lanthanum oxide and tantalum oxide ($Ta_2O_5$) were mixed in a molar ratio of 8:3:4 instead of 9:2:4.

Example 5

Example 3 was repeated to provide compound $Sr_9Y_2Nb_4O_{22}$, except that yttrium oxide ($Y_2O_3$) and niobium oxide ($Nb_2O_5$) were used instead of lanthanum oxide ($La_2O_3$) and tantalum oxide ($Ta_2O_3$).

Example 6

Example 3 was repeated to provide compound $Sr_{10}Y_1Nb_4O_{21.5}$, except that yttrium oxide ($Y_2O_3$) and niobium oxide ($Nb_2O_5$) were used instead of lanthanum oxide ($La_2O_3$) and tantalum oxide ($Ta_2O_3$), and the molar ratio of precursor compounds was changed from 9:2:4 to 10:1:4.

Example 7

Example 3 was repeated to provide compound $Sr_{10}Ba_1Nb_4O_{21}$, except that barium carbonate ($BaCO_3$) and niobium oxide ($Nb_2O_5$) were used instead of lanthanum oxide ($La_2O_3$) and tantalum oxide ($Ta_2O_3$), and the molar ratio of precursor compounds was changed from 9:2:4 to 10:1:4.

Comparative Example 1

Example 1 was repeated to provide compound $Sr_{12}Nb_4O_{22}$, except that the metal-based molar ratio of strontium carbonate ($SrCO_3$) to tantalum oxide ($Ta_2O_5$) was changed from 11:4 to 12:4.

Experimental Example 1

Analysis of Chemical Compositions of Metal Composite Oxides (ICP-AES)

The chemical compositions of the metal composite oxides according to the present invention were analyzed by ICP-AES (Inductively Coupled Plasma Atomic Emission Spectroscope).

1-1. Analysis of Metal Composite Oxides Represented by Formula 1

As samples, the strontium-tantalum-containing composite oxide prepared in Example 1 and the strontium-niobium-containing oxide prepared in Example 2 were used. Each sample was pulverized, poured into a glass vial, dissolved with concentrated nitric acid and completely decomposed by using hydrogen peroxide. Each sample was diluted to three different volumes and analyzed by a standard method using ICP-AES (GDC Integra XMP).

After ICP elemental analysis was performed on the samples, it was shown that the molar ratio of strontium to tantalum is 11.00:4.00 (±0.02). The mole number of oxygen was calculated to be 21 based on the oxidation numbers of the metals and the above molar ratio. Consequently, it was confirmed that the strontium-tantalum-containing oxide according to Example 1 can be represented by $Sr_{11}Ta_4O_{21}$. The metal composite oxide according to Example 2 was analyzed in the same manner. The results of analysis revealed that the molar ratio of strontium, niobium and oxygen in the metal composite oxide according to Example 2 are the same as the molar ratio in the metal composite oxide according to Example 1.

1-2. Analysis of Metal Composite Oxides Represented by Formula 2

Elemental analysis was performed in the same manner as described in Experimental Example 1-1, except that the strontium-lanthanum-tantalum-containing composite oxide prepared in Example 3 was used as a sample.

After ICP elemental analysis was performed on the sample, it was shown that the molar ratio of strontium, lanthanum and tantalum is 9.00:2.00:4.00 (±0.02). The mole number of oxygen was calculated to be 22. Consequently, it was confirmed that the strontium-lanthanum-tantalum-containing oxide according to Example 3 can be represented by $Sr_9La_2Ta_4O_{22}$. The chemical compositions of the metal composite oxides according to Examples 4~7 could be confirmed in a similar manner.

Experimental Example 2

Analysis of Crystal Structures of Metal Composite Oxides

The following analysis was performed to analyze the crystallographic structures of the metal composite oxides according to the present invention.

2-1. Analysis of Crystal Structure Using X-ray Diffraction Pattern (XRDP)

As samples for diffraction analysis, the strontium-tantalum-containing composite oxide ($Sr_{11}Ta_4O_{21}$) of Formula 1 prepared in Example 1, and strontium-containing composite oxides prepared in Examples 3 to 7 were used. Each sample was pulverized and filled in a sample holder for X-ray powder diffraction. Each sample was scanned using Bruker DB-Advance XRD with $CuK\alpha_1$ ($\lambda$=1.5405 Å) radiation at an applied voltage of 40 kv and an applied current of 50 mA and with a step size of 0.02°.

Figure 1:
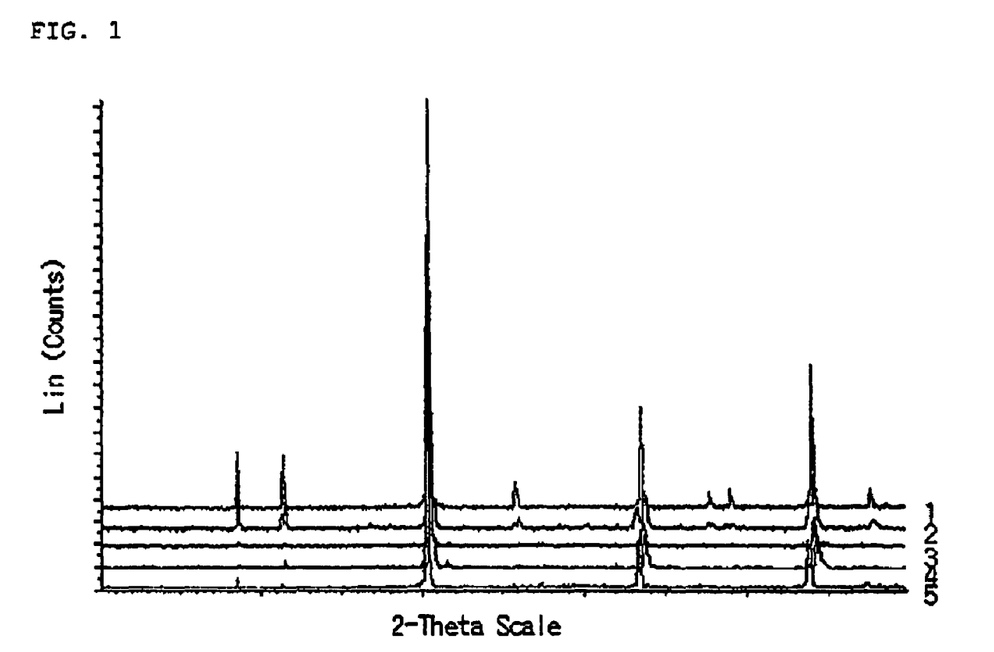
FIG. 1 is a graph showing the X-ray diffraction (XRD) patterns of novel strontium-containing metal composite oxides prepared in Examples 3~7.

After reviewing each X-ray diffraction pattern (XRDP) obtained from the strontium-containing composite oxide of Formula 1 prepared in Example 1 and the strontium-containing composite oxides of Formula 2 prepared in Examples 3 and 5~7, a lattice parameter of 8.327±0.5 Å was obtained from the positions of the XRDP peaks. After indexing all peaks and observing the extinction rule in each diffraction pattern, a space group of Fm-3m (no. 225) was determined. (see Table 2 and FIG. 1).

Meanwhile, it was shown that the metal composite oxide prepared in Example 4 has a body centered tetragonal crystal structure including a lattice that elongates in one direction (see Table 2).

In addition, from the XRDPs with all peaks indexed, it was confirmed that each of the strontium-containing composite oxides according to Examples 1~7 is a pure single-phase with no impurity.

TABLE 2

|  | Formula | Space group | Lattice parameter (Å) |
|---|---|---|---|
| Ex. 1 | $Sr_{11}Ta_4O_{21}$ | Fm-3m | a = 8.327(5) |
| Ex. 2 | $Sr_{11}Nb_4O_{21}$ | Fm-3m | a = 8.338(5) |
| Ex. 3 | $Sr_9La_2Ta_4O_{22}$ | Fm-3m | a = 8.330(5) |
| Ex. 4 | $Sr_8La_3Ta_4O_{22.5}$ | I4/mmm | a = 5.854(5), c = 8.367(5) |
| Ex. 5 | $Sr_9Y_2Nb_4O_{22}$ | Fm-3m | a = 8.297(5) |
| Ex. 6 | $Sr_{10}Y_1Nb_4O_{21.5}$ | Fm-3m | a = 8.270(5) |
| Ex. 7 | $Sr_{10}Ba_1Nb_4O_{21}$ | Fm-3m | a = 8.343(5) |

2-2. Setting of Structural Model and Rietveld Refinement Analysis Results

To determine the crystal structure of the metal composite oxides according to the present invention, all peaks obtained from Experimental Example 2-1 were analyzed by using GSAS (A. C. Larson and R. B. Von Dreele, "General Structure Analysis System," Report no. LAUR086-748, Los Alamos National Laboratory, Los Alamos, N. Mex. 87545) program. An ideal crystal structure of cryolite was taken as the initial model, and Rietveld refinement analysis was performed for each XRD pattern by taking the x coordinate of oxygen ion, site occupancies of cations and temperature factors as parameters. After the Rietveld analysis, the reliability of the structural model set by the inventors of the present invention was $R_w$=8.0%. The final crystallographic data obtained from the analysis are shown in the following Table 3 (metal composite oxides represented by Formula 1) and Table 4 (metal composite oxides represented by Formula 2)

Figure 2:
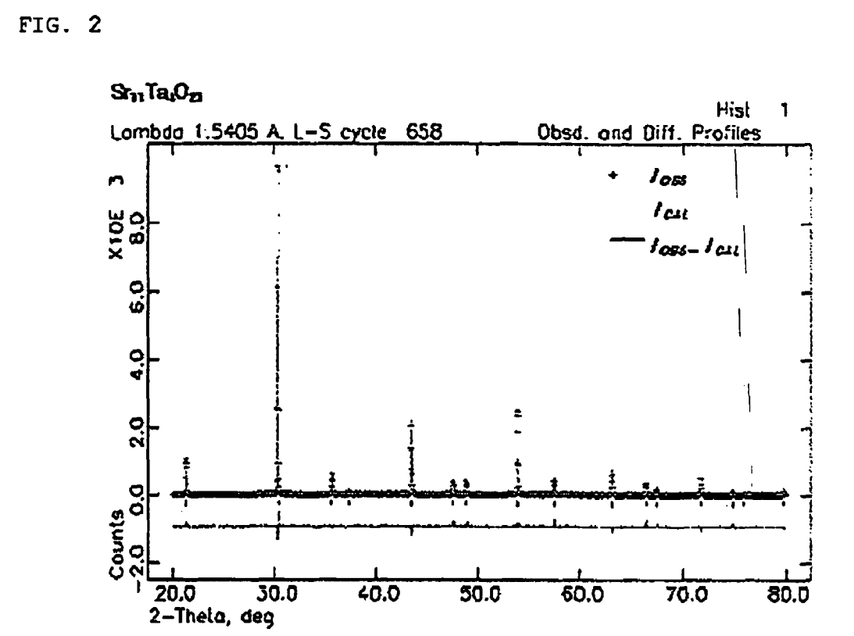
FIG. 2 is a Rietveld profile illustrating the XRD pattern of the strontium-tantalum-containing composite oxide ($Sr_{11}Ta_4O_{21}$) prepared in Example 1 when compared with the theoretical pattern of a structure model.

In addition, it can be seen that FIG. 2 showing Rietveld profile of the metal composite oxides represented by Formula 1 conforms to the structural model. In other words, the difference peaks observed below the Bragg position in the Rietveld profile indicate that the measured peaks conform to the simulation peaks of the structural model in all measurement sections. This demonstrates that the crystal structure determination in Table 3 using the structural model is correct, and the metal composite oxides represented by Formula 1 according to the present invention (e.g. a strontium-tantalum-containing composite oxide) are in a single phase.

Figure 3:
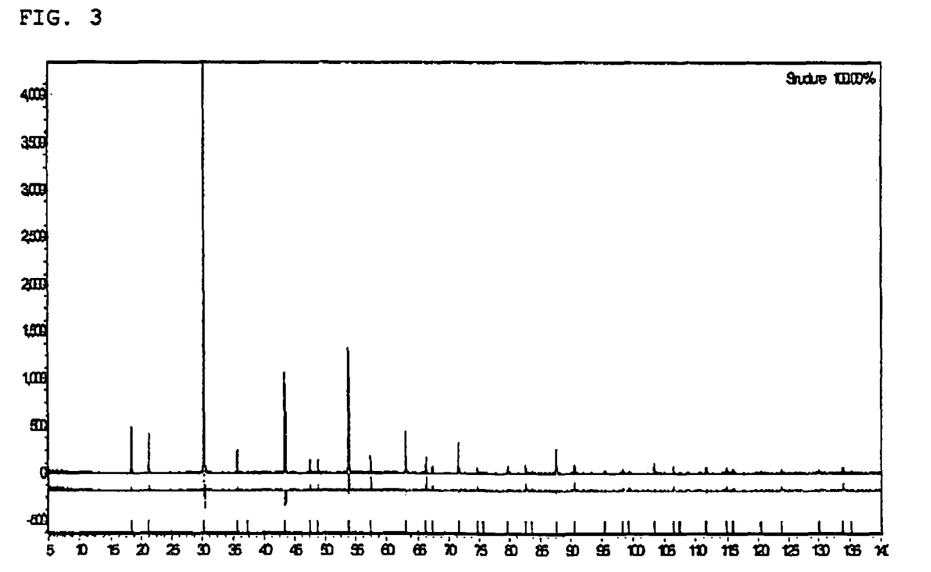
FIG. 3 is a Rietveld profile illustrating the XRD pattern of the strontium-lanthanum-tantalum-containing composite oxide ($Sr_9La_2Ta_4O_{22}$) prepared in Example 3 when compared with the theoretical pattern of a structure model.

Further, FIG. 3 also shows Rietveld profile of the metal composite oxides represented by Formula 2. Like the metal composite oxides represented by Formula 1, the difference peaks observed below the Bragg position in the Rietveld profile indicate that the measured peaks conform to the simulation peaks of the structural model in all measurement sections. Therefore, this demonstrates that the crystal structure determination in Table 4 using the structural model is also correct, and the metal composite oxides represented by Formula 2 according to the present invention are in a single phase (see FIG. 3).

It is known that $Sr_{12}Ta_4O_{22}$ (=$Sr_6Ta_2O_{11}$), an existing strontium-tantalum-containing composite oxide known to have a cryolite structure, shows a site occupancy of 1 for Sr1 site and Sr2 site each, while showing a site occupancy of less than 1 for oxygen (Solid State Ionics, 156 (2003) 95-102). On the contrary, as listed in Table 4, the strontium-containing composite oxide ($Sr_{11}Ta_4O_{21}$) represented by Formula 1 according to the present invention shows a site occupancy of less than 1 for Sr2 site and La2 site in addition to oxygen. Particularly, La site occupancy and Sr2 site occupancy are significantly less than 1 (see Table 4). For reference, a site occupancy of less than 1 indicates the presence of metal ion defects. Therefore, it can be seen from the above results that the metal composite oxides according to the present invention have metal ion defects as well as oxygen defects within the lattice structure.

TABLE 3

| Atom | Site | x | y | z | Occup. | $U_{iso}$ |
|---|---|---|---|---|---|---|
| Sr1 | 8c | 0.25 | 0.25 | 0.25 | 0.965(4) | 0.0475(7) |
| Sr2 | 4b | 0.5 | 0.5 | 0.5 | 0.820(7) | 0.0475(7) |
| Ta | 4a | 0 | 0 | 0 | 1 | 0.0475(7) |
| O | 24e | 0.2693(29) | 0 | 0 | 0.875 | 0.0475(7) |

TABLE 4

| Atom | Site | X | Y | Z | Occu | Uiso |
|---|---|---|---|---|---|---|
| Sr1 | 8c | 0.25 | 0.25 | 0.25 | 1 | 0.027 |
| Sr2 | 4b | 0.5 | 0.5 | 0.5 | 0.25 | 0.027 |
| La | 4b | 0.5 | 0.5 | 0.5 | 0.5 | 0.027 |
| Ta | 4a | 0 | 0 | 0 | 1 | 0.027 |
| O | 24e | 0.257 | 0 | 0 | 0.917 | 0.027 |

Figure 4:
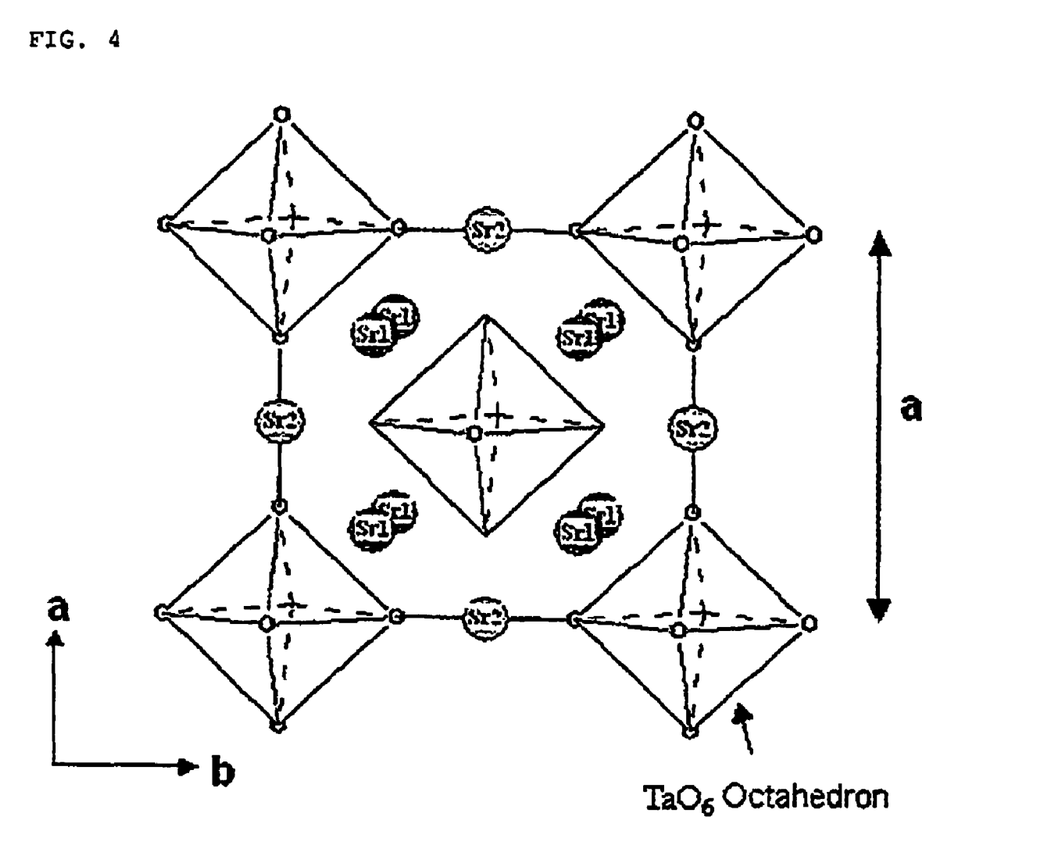
FIG. 4 is a crystal structure view of strontium-tantalum-containing composite oxide ($Sr_{11}Ta_4O_{21}$) prepared in Example 1 on the ab-plane (001 plane)

Meanwhile, FIG. 4 is a crystal lattice structure view of $Sr_{11}Ta_4O_{21}$ prepared in Example 1 on the ab-plane (001 plane), which illustrates positions of Sr(1), Sr(2) and $TaO_6$ octahedrons in the lattice structure. Herein, Sr(1) is an octahedral site with dodeca-dendate oxygen coordination, while Sr(2) is an octahedral site with hexa-dendate oxygen coordination. It can be seen that the metal composite oxides according to the present invention have metal defects in the Sr(1) and Sr(2) sites as well as oxygen ion defects in the oxygen sites.

Experimental Example 3

Evaluation of Oxygen Ion Conductivity

The following experiment was carried out to evaluate the ionic conductivity of the metal composite oxides prepared according to the present invention.

As samples, the strontium-containing composite oxides represented by Formula 1 and prepared according to Examples 1 and 2, and the strontium-containing composite oxides represented by Formula 2 and prepared according to Examples 3~7 were used. As a control, the strontium-tantalum-containing composite oxide ($Sr_{12}Ta_4O_{22}$) known to have a cryolite structure and prepared according to Comparative Example 1 was used.

The conductivity of each sample can be measured by the impedance spectroscopy and/or the DC four-terminal method as described hereinafter.

According to the impedance spectroscopy, the conductivity of each sample was measured at a frequency ranging from 0.1 Hz to 32 MHz via complex impedance spectroscopy. After heat stabilization, each sample was measured in moisture-free air at an electric potential of about 100 mV for about 1 hour. Additionally, according to the DC four-terminal method, conductivity was measured as a function of temperature. More particularly, each sample was sintered at a higher temperature than the temperature where the sample was prepared, and then it was processed into the fore of a bar. Then, strip-like porous Pt electrodes were applied to four positions including both ends and the middle portion of the sample piece to form electrodes. A voltage drop was read at the two inner electrodes, while allowing electric current to flow through the two outer electrodes. At this time, electric current was applied in such a range that the voltage can be maintained in a range between −1V and 1V. The resistance and conductivity of each sample were calculated from the voltage and current measured as described above. For reference, the total conductivity measured by the two methods exists within a range of experimental error as compared to the total conductivity measured in the air and the total conductivity measured in nitrogen atmosphere. Therefore, the total conductivity can be regarded as ionic conductivity.

Figure 5:
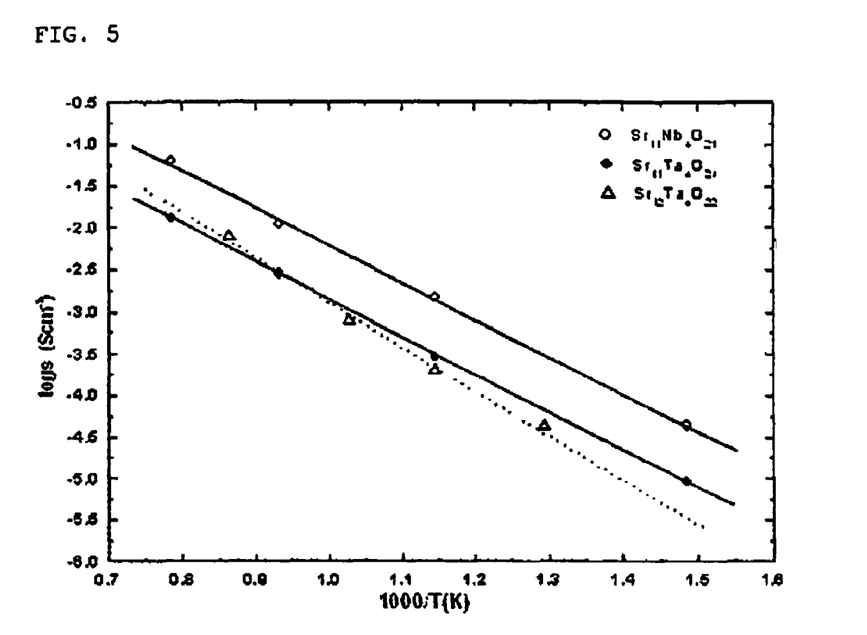
FIG. 5 is a view showing ion conductivity of $Sr_{11}B_4O_{21}$ (B=Ta, Nb) prepared in Examples 1 and 2 and a known metal composite oxide, $Sr_{12}Ta_4O_{22}$ at various temperatures.
Figure 6:
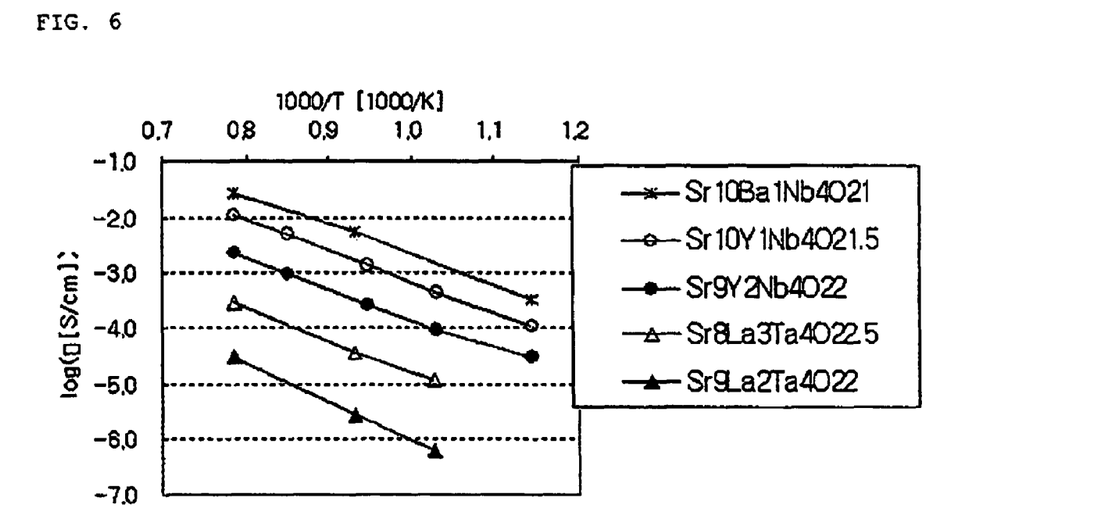
FIG. 6 is a graph showing ion conductivity of novel strontium-containing metal composite oxides prepared in Examples 3~7.

After the experiment, it can be seen that the metal composite oxides according to the present invention exhibit an excellent oxygen ion conductivity at various temperatures when compared to the ion conductivity of the control ($Sr_{12}Ta_4O_{22}$) (see FIGS. 5 and 6). It is thought that such excellent oxygen ion conductivity of the metal composite oxide according to the present invention results from the open space formed within the lattice by the metal ion defects present in the crystal structure. Therefore, the metal composite oxide of the present invention can be used as an ionic conductor.

INDUSTRIAL APPLICABILITY

As can be seen from the foregoing, the metal composite oxide according to the present invention has an improved ion conductivity, because formation of an open space within a lattice is ensured by the defects of metal ion sites in the lattice. Therefore, the metal composite oxide of the present invention is useful for an ionic conductor or an electrochemical device requiring ionic conductivity.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. An ionic conductor characterized by comprising oxygen defects and metal defects in a cryolite lattice, wherein the ionic conductor comprises a metal composite oxide represented by the following Formula 1 or the following Formula 2:

[Formula 1]

$$Sr_{12-x}B_4O_{21\pm\delta}C_z \quad (I)$$

wherein B is at least one element selected from the group consisting of Ta and Nb;
C is at least one anion selected from the group consisting of S and halogen atoms, or $H^+$ cation;
x is a decimal ranging from 0.8 to 1.2 (0.8≦x≦1.2);
δ is a decimal ranging from 0 to 3 (0.1≦δ≦3); and
z is a decimal ranging from 0 to 7 (0≦z≦7),

[Formula 2]

$$Sr_{11-x+y}A_xB_4O_{24-\delta}C_z \quad (II)$$

wherein A is at least one element selected from the group consisting of La, Ba and Y;
B is at least one element selected from the group of Ta and Nb;
C is at least one anion selected from the group consisting of S and halogen atoms, or $H^+$ cation;

x is a decimal greater than 0 and less than or equal to 3 ($0 < x \leq 3$);

y is a decimal ranging from −1 to 1 ($-1 \leq x \leq 1$);

δ is a decimal ranging from 0 to 3 ($0 \leq \delta \leq 3$); and z is a decimal ranging from 0 to 7 ($0 \leq z \leq 7$).

2. The ionic conductor according to claim 1, which facilitates movement and transfer of ions through an open space formed within the lattice by the metal defects.

3. The ionic conductor according to claim 1, which satisfies the conditions of crystallographic coordinates and site occupancies thereof in the following Table 1 (space group No. 225, Fm3m):

TABLE 1

| Crystallographic coordinates of cations (X, Y, Z) | Site occupancy (O) |
|---|---|
| 8c (¼, ¼, ¼) | $0 < O \leq 1$ |
| 4b (½, ½, ½) | $0 < O \leq 1$ |
| 4a (0, 0, 0) | $0 < O \leq 1$ |
| 24e (x, 0, 0), $0.20 \leq x \leq 0.30$ | $0 < O \leq 1$. |

4. The ionic conductor according to claim 1, which is oxygen- or proton ($H^+$)-selective.

5. An electrochemical device comprising the metal composite oxide according to claim 1 as an ionic conductor, wherein the ionic conductor characterized by comprising oxygen defects and metal defects in a cryolite lattice.

6. The electrochemical device according to claim 5, which is selected from the group consisting of an oxygen probe, a fuel cell, a chemical membrane reactor, an oxygen separation membrane, an oxygen pump, a hydrogen separation membrane, a hydrogen pump, a hydrogen gas sensor, a steam sensor, a hydrocarbon sensor, a hydrogen extraction, a hydrogen pressure controller, isotope enrichment, tritium technology, steam electrolysis, $H_2S$ electrolysis, HCl electrolysis, hydrogenation of hydrocarbon, dehydrogenation, $NH_3$ formation, an electrochemical cell, an electrochromic device, a gas sensor, and a $NO_x$ trap.

7. A metal composite oxide represented by the following Formula 1:

[Formula 1]

$$Sr_{12-x}B_4O_{21\pm\delta}C_z \quad (I)$$

wherein B is at least one element elected from the group consisting of Ta and Nb;

C is at least one anion selected from the group consisting of S and halogen atoms, or $H^+$ cation;

x is a decimal ranging from 0.8 to 1.2 ($0.8 \leq x \leq 1.2$);

δ is a decimal ranging from 0 to 3 ($0.1 \leq \delta \leq 3$); and z is a decimal ranging from 0 to 7 ($0 \leq z \leq 7$).

8. The metal composite oxide according to claim 7, which is in a cubic crystal system.

9. The metal composite oxide according to claim 7, which belongs to space group of fm-3m (No. 225) and has a lattice parameter of 8.327±0.5 Å.

10. The metal composite oxide according to claim 7, which is selected from the group consisting of $Sr_{11}Ta_4O_{21}$ and $Sr_{11}Nb_4O_{21}$.

11. A metal composite oxide represented by the following Formula 2:

[Formula 2]

$$Sr_{11-x+y}A_xB_4O_{24-\delta}C_z \quad (II)$$

wherein A is at least one element selected from the group consisting of La, Ba and Y;

B is at least one element selected from the group consisting of Ta and Nb;

C is at least one anion selected from the group consisting of S and halogen atoms, or $H^+$ cation;

x is a decimal greater than 0 and less than or equal to 3 ($0 \leq x \leq 3$);

y is a decimal ranging from −1 to 1 ($-1 \leq x \leq 1$);

δ is a decimal ranging from 0 to 3 ($0 \leq \delta \leq 3$); and z is a decimal ranging from 0 to 7 ($0 \leq z \leq 7$).

12. The metal composite oxide according to claim 11, which is in a cubic crystal system or tetragonal crystal system.

13. The metal composite oxide according to claim 11, which belongs to space group of fm-3m (No. 225) and has a lattice parameter of 8.327±0.5 Å.

14. The metal composite oxide according to claim 11, which belongs to space group of 14/mmm, and has the following lattice parameters: a=5.8536±0.5 Å, and c=8.327±0.5 Å.

15. The metal composite oxide according to claim 11, which is selected from the group consisting of $Sr_9La_2Ta_4O_{22}$, $Sr_8La_3Ta_4O_{22.5}$, $Sr_9Y_2Nb_4O_{22}$, $Sr_{10}Y_1Nb_4O_{21.5}$, and $Sr_{10}Ba_1Nb_4O_{21}$.

* * * * *